United States Patent [19]

Thompson

[11] Patent Number: 4,574,120

[45] Date of Patent: Mar. 4, 1986

[54] METHOD FOR PREPARING HIGH ACTIVITY SILICA SUPPORTED HYDROTREATING CATALYSTS

[75] Inventor: Mark S. Thompson, Houston, Tex.

[73] Assignee: Shell Oil Company, Houston, Tex.

[21] Appl. No.: 660,624

[22] Filed: Oct. 15, 1984

[51] Int. Cl.$^4$ .................. B01J 27/04; B01J 27/10; B01J 23/74

[52] U.S. Cl. .................... 502/220; 502/255; 502/221; 502/228; 208/143

[58] Field of Search .............. 502/255, 220, 221, 228; 208/143

[56] References Cited

U.S. PATENT DOCUMENTS 3,167,496  1/1965  Solomon .................. 208/143
3,420,771  1/1969  O'Hara .................... 208/216

*Primary Examiner*—Andrew H. Metz
*Assistant Examiner*—Chung K. Pak

[57] ABSTRACT

A non-aqueous method of preparing an improved silica supported hydrotreating catalyst by reacting a mixture of $Mo(Cl)_5$ and $Ni(H_2O_6)CL_2$ and/or $Co(H_2O)_6Cl_2$ in the presence of acetonitrile and impregnating a dried silica support with said mixture. The impregnated support is dried and sulfided before it is used in a hydrotreating process.

4 Claims, No Drawings

METHOD FOR PREPARING HIGH ACTIVITY SILICA SUPPORTED HYDROTREATING CATALYSTS

BACKGROUND OF THE INVENTION

The invention relates to a non-aqueous method of preparing an improved silica supported hydrotreating catalyst. Silica supported hydrotreating catalysts, when prepared by conventional aqueous pore-filling impregnation with catalytically active metals, tend to have very poor activity compared to corresponding alumina based catalysts. This is thought to be because the metal oxides ($MoO_3$, $NiO$, $CoO$) react very weakly with the support, and thus are very poorly dispersed on the support.

Potentially, silica based hydrotreating catalysts should perform well in treating residual oil feedstocks. Silica based catalysts should be less prone to coke formation than alumina based catalysts because of the lower acidity of silica. Since coke depositon is a major catalyst deactivator in such applications, an active and stable silica based catalyst could have an enormous impact on hydrotreating such feedstocks.

PRIOR ART

U.S. Pat. Nos. 3,167,496 and 3,167,497 disclose processes for hydrogenating olefins and aromatics in the presence of catalysts comprising molybdenum and nickel in a particular atomic ratio supported on silica. These catalysts are prepared by aqueous impregnation, preferably with the precursor of the molybdenum catalytic agent prior to impregnation with the precursor of the nickel catalytic agent. The molybdenum compound content ranges between about 12 and about 35%wt. (as $MoO_3$), based on total weight of the catalyst. The nickel compound is preferably present in an amount to provide an atomic ratio of molybdenum to nickel between about 2-3.

U.S. Pat. No. 3,420,771 discloses a process for hydrorefining an asphaltenic hydrocarbonaceous charge stock containing either sulfurous or nitrogeneous compounds in contact with a catalyst prepared by impregnating hydrated silica which has not been calcined (5-15%w water) with from about 4-30%wt. of aqueous molybdenum compounds prior to calcining. Preferably the catalyst also contains from about 1-6% wt. nickel. Nickel nitrate hexahydrate and phosphomolybdic acid are suggested as the source of catalytically active metals.

These prior art methods of preparing silica supported catalysts all suffer from the disadvantage of poor catalytic metals distribution on the support. I have discovered a non-aqueous method for preparing silica based hydrotreating catalysts which overcomes this disadvantage by improving the dispersion of metals on the support, thereby greatly increasing catalytic activity.

SUMMARY OF THE INVENTION

The invention is a non-aqueous method for preparing a silica supported hydrotreating catalyst containing from about 10-25%w molybdenum and from about 1-5%w nickel and/or cobalt as hydrogenation metals which comprises:

(a) reacting a mixture of $MoCl_5$ and $Ni(H_2O)_6Cl_2$ and/or $Co(H_2O_6Cl_2$ in amounts to provide a desired catalytic metals concentration on a support in the presence of a solubilizing amount of acetonitrile;

(b) heating the mixture to between about 25° and 80° C. until most of the metal compounds have reacted and/or dissolved;

(c) removing any undissolved solids from the solution;

(d) impregnating a dried silica support with the hydrogenation metals-containing solution in one or more steps; and (e) drying the impregnated silica support at elevated temperature.

DETAILED DESCRIPTION OF THE INVENTION

It has been reported (R. Fricke, W. Hanke and G. Ohlmann, J. Catal., 79, 1, (1983) from experiments in preparing supported metal halides that the strong support-metal interaction resulting from the dehydrohalogenation reaction between metal halide and support hydroxyl (reaction I) could yield well dispersed catalytic precursors.

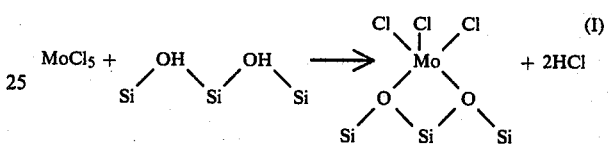

Similarly, it was felt that the oxophilic nature of $MoCl_5$ would permit the formation of stable oxo or hydroxy linkages between Ni and Mo in the preparative solution that could yield a catalyst precursor that would sulfide to a mixed metal sulfide phase in the final catalyst. Such phases have been postulated as the active phase in hydrotreating catalysts. These goals have been realized to a varying extent by the method of the invention.

The improved catalyst of the invention is prepared by reacting $MoCl_5$ and $Ni(H_2O)_6Cl_2$ and/or $Co(H_2O)_6Cl_2$ in the presence of acetonitrile. The Ni-Mo or Co-Mo solution, thus prepared, is then used to impregnate a suitable dried silica support. The impregnated support is then dried, but need not be calcined. The resulting catalyst has more than 90% of the hydrodenitrification (HDN) activity of a high activity commercially available alumina-based hydrotreating catalyst with comparable metals content. Furthermore, it has greatly increased hydrogenation and hydrodesulfurization ($H_2$, HDS) activities over a silica-based hydroconversion catalyst containing comparable metals contents, but prepared in a manner similar to that of a commercial alumina-based hydrotreating catalyst, i.e., by aqueous metal impregnation of the support.

Full characterization of the impregnation solution has not been made. However, the reaction between $MoCl_5$ and $Ni(H_2O)_6Cl_2$ or $Co(H_2O)_6Cl_2$ proceeds with great vigor and the release of HCl gas. Based on this observation and elemental analysis data, a reasonable guess as to the reaction path appears below (reaction II). The reaction product is very soluble in acetonitrile and can be impregnated directly into a support. The impregnated support is then dried, preferably under a vacuum. Calcination is not required.

$$2MoCl_5 + Ni(H_2O)_6Cl_2 \xrightarrow{CH_3CN/CHCl_3} \quad \text{II}$$

$$H_4[(Cl_3MoO_2)_2Ni] + 4HCl$$

Suitable hydrotreating catalysts of the invention generally contain from about 10-25%w molybdenum and from about 1-5%w nickel and/or cobalt on a dried silica support. Preferably, the catalysts will contain from about 10-20% molybdenum and from about 2-4%w nickel and/or cobalt. Of the latter metal, nickel is the most preferred.

The activity testing of the catalysts of this invention was done in microreactor systems. These units are of conventional, fixed-bed, downflow design. Each unit consists of a ½-inch O.D. reaction with a preheat section, a phase separator and a large product tank. Unit pressure is controlled by a motor valve on the outlet gas line and inlet $H_2$ rate is maintained by pressure drop across a length of capillary tubing. LAPP pumps are used for charging liquid feed. Emergency circuitry automatically shuts down the unit in the event of fire, high reactor temperature, high or low unit pressure or loss of instrument air.

Catalysts were crushed, screened to 16-45 mesh and dried at 900° F. for testing. To facilitate control of the reactor temperature the catalyst was diluted 1-1 by volume with a high-density alumina or silicon carbide ground to 16-45 mesh. Prior to processing hydrocarbon feed, the catalyst was presulfided at atmospheric pressure with 5% $H_2S$ in $H_2$. The temperature program for the presulfiding was 2 hours at 400° F., 1 hour at 600° F. and 2 hours at 700° F. Depending upon the metals content, the catalyst will contain from about 10-20%w sulfur.

Elemental composition of the catalyst of the invention before and after sulfiding appears in Table 1.

TABLE 1

|  | % w Mo | % w Ni | % w S | % w Cl |
|---|---|---|---|---|
| Before Sulfiding | 13.4 | 2.5 | 0 | 13.0 |
| After Sulfiding | 17.2 | 3.1 | 16.3 | 0.3 |

The most noteworthy feature of these data is that the total metal:sulfur ratio (metal=Mo+Ni) is 1 to 2.1. This is sulfur-rich relative to the expected $MoS_2$/NiS system. Additionally, a thermogravimetric analysis clearly indicated that the sulfur was chemisorbed or structural rather than merely physisorbed.

In a typical Ni/Mo or Co/Mo hydrotreating catalyst preparation method catalytically active metals are deposited on a support by a dry (pore volume) impregnation technique. In this method, the support is impregnated with a quantity of metal-salt solution that is just sufficient to be absorbed in the pore volume of the support. The impregnating solution is generally prepared in two parts initially. One part contains the molybdenum salt and most of the water that can be used. After most of the molybdenum salt has dissolved (with heating and stirring), $H_2O_2$ (30%) is added (about 0.4 cc/g of Mo) to aid solubilization. The other part of the solution contains the Ni and/or Co salt(s) and sufficient phosphoric acid (85%) to aid the solubility and stability of the solution and to include about 3%w P in the catalyst. When both solutions are clear and cool, the Mo solution is added slowly (with vigorous stirring) to the Ni-P or Co-P solution. The combined solution is then diluted to the proper volume and added slowly, usually in one or more steps, to the support. The impregnated catalyst is dried at 250° F. for about 2 hours and then calcined in air at 900° F. for about 2 hours.

A substantial increase in the hydrodenitrification (HDN) activity, relative to existing commercial catalysts, is required to commercialize a new hydrotreating catalyst. In an effort to develop such an improved catalyst, a standard 72 hour HDN activity test was used to evaluate the various catalysts. In this test the HDN and HDS activities of a cat cracked heavy gas oil (CCHGO) were evaluated at 344° C. and 850 psi $H_2$ partial pressure. Activities were compared based on observed rate constants for HDN and on plug flow kinetics for HDS.

Suitable hydroconversion conditions for the processes using improved catalysts according to the invention are as follows:
 a temperature of 350°-420° C.;
 a total pressure of 75-200 bar;
 a partial hydrogen pressure of 60-200 bar;
 a space velocity of 0.4-1.5 kg oil/l catalyst/hour; and
 a hydrogen feed rate of 250-2500 Nl/kg oil feed.

The hydrodenitrification of heavy oil feeds according to the present process is preferably carried out under the following conditions:
 a temperature of 360-410° C.;
 a total pressure of 100-150 bar;
 a partial hydrogen pressure of 80-150 bar;
 a space velocity of 0.4-1.0 kg oil/l catalyst/hour; and
 a hydrogen feed rate of 500-1500 Nl/kg oil feed.

The hydrogen applied can be pure hydrogen or a hydrogen-containing gas, preferably one comprising more than 70% hydrogen. The hydrogen-containing gas may also contain up to about 10% of hydrogen sulfide.

The invention will now be illustrated by the following examples:

EXAMPLE 1

Two catalysts, A (alumina based) and B (silica based) were prepared for comparison by a conventional aqueous impregnation method and were not prepared according to the method of invention.

Catalyst A was a standard commercial hydrotreating catalyst (available from Shell Chemical company) which was prepared by using a dry (pore volume) metals aqueous impregnation technique to impart metals onto a gamma alumina support. This catalyst was prepared by the typical aqueous impregnation method described above in the specification. The composition of this alumina based catalyst is given in Table 2. The various hydrotreating activities of this catalyst were taken as 1.0 for comparison.

Catalyst B was prepared by impregnating a dried Grade 57 silica (from Davison Chemical, a division of W. R. Grace Co.) with the same metals solution and dry (pore volume) technique used for Catalyst A. The compositon of this silica based catalyst is also given in Table 2.

EXAMPLE 2

A silica based catalyst, C, was prepared by the method of the invention by mixing 55.3 g $MoCl_5$ and 23.8 g $Ni(H_2O)_6Cl_2$ in a 250 ml round bottom flask with a condenser. 100 ml acetonitrile were then added slowly through the condenser. The $MoCl_5$ reacted vigorously with the $Ni(H_2O)_6Cl_2$ liberating HCl gas. Upon completion of the addition, the mixture was heated at acetonitrile reflux temperature (ca.78° C.) for 1 hour, cooled, filtered and diluted to 140 ml with acetonitrile. 70 g dry (120° C.) 20/30 mesh grade 57 Davison silica were then impregnated with 80 ml of this solution, dried under vacuum at 80° C., and then impregnated with the remaining solution. The resulting catalyst was then dried overnight at 80° C. under vacuum (about 20 Tor). Calcining the catalyst was not required. The composition of Catalyst C is also given in Table 2.

TABLE 1

| Catalyst (Support) | Composition % w Mo | Composition % w Ni | Surface Area m²/g | Relative Activity H₂ | Relative Activity HDN | Relative Activity HDS |
|---|---|---|---|---|---|---|
| A (Al₂O₃) | 13.2 | 2.7 | 160 | 1.00 ± .03 | 1.00 ± .10 | 1.00 ± .10 |
| B (SiO₂) | 15.0 | 3.0 | — | 0.71 | 0.17 | 0.20 |
| C (SiO₂) | 13.4 | 2.5 | 163 | 0.92 | 0.92 | 0.75 |

EXAMPLE 3

The three catalysts (A, B, C) were heated to about 200° C., presulfided and compared to their determine relative hydrotreating activities (H$_2$=hydrogenation; HDN=hydrodenitrification; HDS=hydrodesulfurization) over a standard CCHGO feed under first stage hydrocracking conditions. (Feed properties: 88.99%C; 9.68%H$_2$; 1.28%S; 482 ppm N). For these tests, 10.4 cc of 16/45 mesh catalyst were placed in a microreactor and used to contact the feed at 344° C., 850 psig, H$_2$/oil ratio=4/1 and LHSV=2.0. Results of these tests are shown in Table 1.

The relative activity of the commercial alumina based catalyst A, was taken as 1.00 by definition. As can be seen from Table 1, the activity of the silica based catalyst B, prepared in the same manner as that normally used for a commercial alumina based hydrotreating catalyst gave very poor results for all three (H$_2$, HDN, HDS) hydrotreating activites. However, the activity of the silica based catalyst C, prepared by the method of the invention is within experimental error of the activity of a top quality commercial alumina based hydrotreating catalyst, A, and nearly six times as active as a conventionally prepared silica based catalyst.

What is claimed is:

1. A method for preparing a silica supported hydrotreating catalyst containing from about 10–25%w molybdenum and from about 1–5%w nickel and/or cobalt as hydrogenation metals which comprises:
   (a) reacting a mixture of MoCl$_5$ and a compound selected from the group consisting of Ni(H$_2$O)$_6$Cl$_2$, Co(H$_2$O)$_6$Cl$_2$ and mixtures thereof in amounts to provide a desired catalytic metals concentration of the support in the presence of a solubilizing amount of acetonitrile;
   (b) heating the mixture to between about 25° and 80° C. until most of the metal compounds have reacted and/or dissolved;
   (c) removing any undissolved solids from the solution;
   (d) impregnating the dried silica support with the hydrogenation metals-containing solution in one or more steps; and
   (e) drying the impregnated silica support at elevated temperature.

2. The method of claim 1 wherein the catalyst is sulfided before being used in a hydrotreating process.

3. The method of claim 1 wherein the reaction mixture of hydrogenation metals contains an amount of MoCl$_5$ and Ni(H$_2$O)$_6$Cl$_2$ to impregnate from about 10–20%w molybdenum and from about 2–4%w nickel into the catalyst.

4. The method of claim 3 wherein the reaction mixture is heated at acetonitrile reflux temperature.

* * * * *